(12) United States Patent
Lambert et al.

(10) Patent No.: US 10,416,447 B2
(45) Date of Patent: Sep. 17, 2019

(54) WINDSHIELD HEAD UP DISPLAY SYSTEM WITH WAVEPLATE

(71) Applicant: Panasonic Automotive Systems Company of America, Division of Panasonic Corporation of North America, Peachtree City, GA (US)

(72) Inventors: David Kay Lambert, Sterling Heights, MI (US); Walter Joseph Nill, Davison, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/782,073

(22) Filed: Oct. 12, 2017

(65) Prior Publication Data

US 2018/0101009 A1 Apr. 12, 2018

Related U.S. Application Data

(60) Provisional application No. 62/407,048, filed on Oct. 12, 2016.

(51) Int. Cl.
*G02B 27/01* (2006.01)
*G02B 27/28* (2006.01)
*G02B 5/30* (2006.01)

(52) U.S. Cl.
CPC ....... *G02B 27/0103* (2013.01); *G02B 5/3066* (2013.01); *G02B 27/0101* (2013.01); *G02B 27/28* (2013.01); *G02B 2027/0109* (2013.01); *G02B 2027/0196* (2013.01)

(58) Field of Classification Search
CPC ............... G02B 27/01; G02B 27/148; G02B 2027/0109; G02B 27/28; G02B 27/0103; G02B 27/81; G02B 27/106; G02B 27/0136; G02B 27/225; G02B 27/1288; G02B 2027/0147; G02B 2027/0174; G02B 2027/0196
See application file for complete search history.

(56) References Cited

U.S. PATENT DOCUMENTS

| | | | | |
|---|---|---|---|---|
| 7,158,095 B2* | 1/2007 | Jenson | ............... | G02B 27/0101 345/207 |
| 7,656,585 B1* | 2/2010 | Powell | ..................... | G02B 5/09 349/11 |
| 2009/0153962 A1* | 6/2009 | Okada | ................ | G02B 27/0101 359/485.02 |
| 2010/0253600 A1* | 10/2010 | Seder | ................ | B32B 17/10036 345/7 |
| 2014/0140653 A1* | 5/2014 | Brown | ................. | G02B 6/0033 385/10 |

(Continued)

*Primary Examiner* — Sultan Chowdhury
(74) *Attorney, Agent, or Firm* — Laurence S. Roach, Esq.

(57) ABSTRACT

A head up display arrangement for a motor vehicle includes a head up display projector including a lens with a polarizer. The head up display projector emits a linearly polarized light field via the lens. A windshield reflects the light field such that the reflected light field is visible to a human driver of the motor vehicle as a virtual image. The windshield includes an outer plastic layer sandwiched between a half-wave plate and an outer glass layer. An inner plastic layer is sandwiched between the half-wave plate and an inner glass layer.

14 Claims, 3 Drawing Sheets

(56) References Cited

U.S. PATENT DOCUMENTS

2016/0091715 A1\* 3/2016 Larson ............... G02B 27/0101
  348/53
2016/0341964 A1\* 11/2016 Amitai ............. B29D 11/00663

\* cited by examiner

WINDSHIELD HEAD UP DISPLAY SYSTEM WITH WAVEPLATE

CROSS-REFERENCE TO RELATED APPLICATIONS

This application claims the benefit of U.S. Provisional Application No. 62/407,048, filed on Oct. 12, 2016, which the disclosure of which is hereby incorporated by reference in its entirety for all purposes.

FIELD OF THE INVENTION

The disclosure relates to a head up display (HUD) in a motor vehicle.

BACKGROUND OF THE INVENTION

A head up display emits light that reflects from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Many current owners of HUD-equipped vehicles have expressed unhappiness with inability to view the HUD image while wearing polarized sunglasses. The following methods are known to enable the image of a windshield HUD to be viewed with polarized sunglasses: (1) The HUD projector emits circularly polarized or elliptically polarized light. This is not a fully satisfactory solution since the windshield reflectivity to p-polarized light is small; (2) The driver can wear non-polarizing sunglasses; (3) A plastic lens, including a wave plate, can be clipped over the polarizing sunglasses; and (4) An interior surface of the windshield can be coated with a reflective layer. Doing so increases windshield reflectance, and, as a result, increases veiling glare.

SUMMARY

The present invention may provide a head up display (HUD) system that reflects light from the front windshield of a vehicle to be seen by the driver as a virtual image. In one embodiment, the system includes a half-wave plate, sandwiched inside the front windshield, oriented at about 45° from the vertical axis. The system can be configured to enable the driver to easily see the virtual image from the HUD while wearing polarized sunglasses.

The invention may also provide a HUD that presents an acceptable image without requiring the use of a wedged windshield. Wedged windshields are designed to superimpose the image reflected from the front and back surface of the windshield to be seen by the driver. With the present invention, projected light reflects from the windshield to be seen by the driver as a virtual image, and mostly reflects from either the inside or outside surface of the windshield. Consequently, there is less need for a wedged windshield. It may be possible to use a windshield that is not wedged. In the embodiment in which the light reflects from the outside surface of the windshield, the light is polarized so the light from the virtual image is fully transmitted to a driver wearing conventional polarized sunglasses.

The invention differs from a conventional windshield HUD system in that the HUD image can be seen with polarized sunglasses.

In one embodiment, the invention comprises a head up display arrangement for a motor vehicle, including a head up display projector having a lens with a polarizer. The head up display projector emits a linearly polarized light field via the lens. A windshield reflects the light field such that the reflected light field is visible to a human driver of the motor vehicle as a virtual image. The windshield includes an outer plastic layer sandwiched between a half-wave plate and an outer glass layer. An inner plastic layer is sandwiched between the half-wave plate and an inner glass layer.

In another embodiment, the invention comprises a head up display method, including providing a head up display projector having a lens with a polarizer. A linearly polarized light field is emitted from the head up display projector via the lens. A windshield is used to reflect the light field such that the reflected light field is visible to a human driver of the motor vehicle as a virtual image. The windshield includes an outer plastic layer sandwiched between a half-wave plate and an outer glass layer. An inner plastic layer is sandwiched between the half-wave plate and an inner glass layer.

In yet another embodiment, the invention comprises a head up display arrangement for a motor vehicle, including a head up display projector apparatus emitting a linearly polarized light field. A windshield has a vertical axis and reflects the light field such that the reflected light field is visible to a human driver of the motor vehicle as a virtual image. The windshield includes a half-wave plate having an axis oriented at an angle of about 45 degrees relative to the vertical axis of the windshield. An outer plastic layer is sandwiched between the half-wave plate and an outer glass layer. An inner plastic layer is sandwiched between the half-wave plate and an inner glass layer.

An advantage of the present invention is that it solves the problem of the driver not being able to see the HUD virtual image while wearing ordinary polarizing sunglasses.

Another advantage of the present invention is that it makes it possible to implement a windshield HUD without a wedged windshield.

An advantage of the present invention over coating an interior surface of the windshield with a reflective layer is that the added reflectance from the half-wave plate can be negligible.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
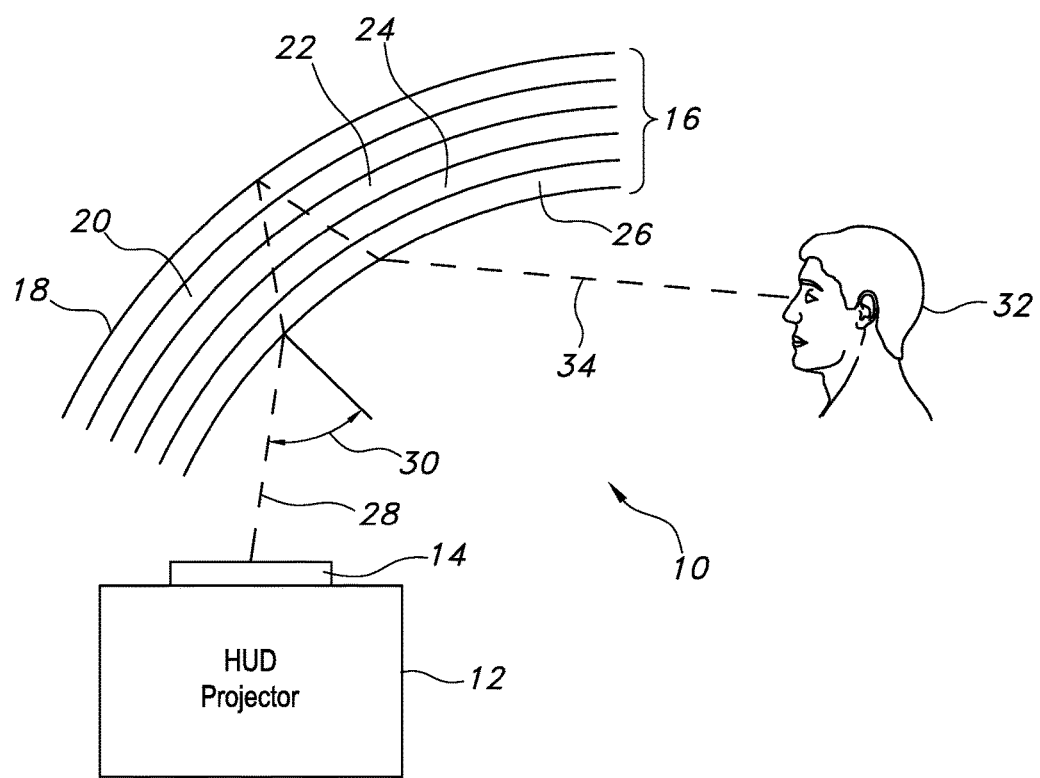
FIG. 1 is a schematic side view of one embodiment of an automotive head up display arrangement of the present invention.

FIG. 1 illustrates one embodiment of an automotive head up display arrangement 10 of the present invention, including a HUD projector 12 having a lens 14 with polarizer. A windshield 16 includes an outer glass layer 18, an outer plastic (e.g., polyvinyl butyral (PVB)) layer 20, a half-wave plate 22, an inner plastic layer 24, and an inner glass layer 26. Half-wave plate 22 may be oriented to interchange s- and p-polarization.

During use, HUD projector 12 emits linearly polarized light 28 through lens 14. A portion of light 28 reflects off the inner surface of inner glass layer 26 at Brewster's angle 30. The remaining portion of light 28 reflects off the outer surface of outer glass layer 18 such that it is visible to driver 32, as indicated at 34.

Figure 2:
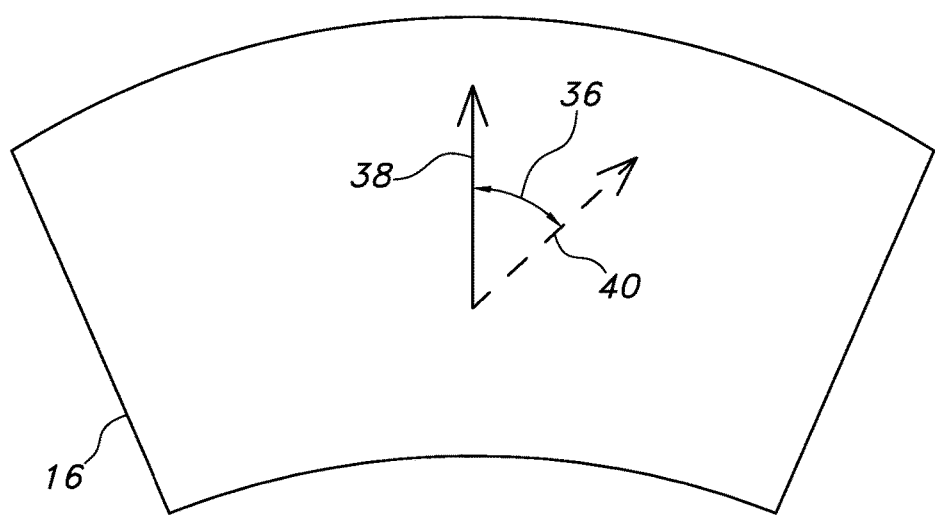
FIG. 2 is a schematic plan view the windshield of FIG. 1.

FIG. 2 illustrates windshield 16 of FIG. 1. An angle 36 between a vertical axis 38 of windshield 16 and an axis 40 of half-wave plate 22 is about 45 degrees. Axis 40 of the half-wave plate 22 may be either 45 degrees to the left from the vertical axis or 45 degrees to the right from the vertical axis. Half-wave plate 22 is sandwiched inside front windshield 16, and is oriented at about 45 degrees from vertical axis 38. HUD projector 12 emits linearly polarized light 28. The emitted light 28 has an electric field in the plane of incidence (p-polarized). The light from HUD projector 12 is incident to windshield 16 at approximately Brewster's angle. At Brewster's angle, linear polarized light 28 with an electric field perpendicular to the plane of incidence (s-polarized) is partially reflected (about 4%), but linear polarized light with an electric field parallel to the plane of incidence (p-polarized) is entirely transmitted.

Since the light from the HUD projector is p-polarized in one embodiment, and is incident at Brewster's angle, there is no reflection from the inside surface of windshield 16. Half-wave plate 22, oriented as described above, converts s-polarized light to p-polarized light, and converts p-polarized light to s-polarized light. The light from projector 12 which is incident on the outer surface of windshield 16 is consequently s-polarized. Therefore, a significant fraction (typically about 4%) of the light intensity is reflected off the outer surface of windshield 16 and back toward driver 32. The reflected light passes again through half-wave plate 22, and is converted from s-polarized light to p-polarized light. Thus, the reflected light is transmitted with negligible reflection, through the inside surface of windshield 16 to be seen by driver 32, as indicated at 34.

The overall effect of the system shown in FIG. 1 is for light from projector 12 to be reflected from only the outside surface of windshield 16, and not from the inside surface. There is less need for windshield 16 to be wedged to avoid an objectionable ghost image. It should be understood, however, that this invention also enables the HUD image to be viewed with polarized sunglasses. Thus, even if a wedged windshield is used for other reasons, the invention provides an important advantage.

To better understand how the system works, consider a linearly polarized beam of light with an electric field along the z direction, and traveling in the x direction. The light passes through a half-wave plate oriented at 45 degrees from the z direction toward the y direction. After passing through the half-wave plate, the light is linearly polarized with an electric field along the y direction. Similarly, consider a linearly polarized beam of light with an electric field along the y direction, also traveling in the x direction. After passing through the half-wave plate, the light is a linearly polarized beam with an electric field along the z direction.

Since the light from the HUD projector is p-polarized, it is not reflected from the inside surface of the windshield. After passing through the half-wave plate, the light is converted from p-polarized to s-polarized. Consequently, a portion of the light is reflected from the outside surface of the windshield. The reflected s-polarized light again passes through the half-wave plate and is converted back to p-polarized light before encountering again the inside surface of the windshield. At the inside surface of the windshield, the p-polarized light is fully transmitted. Thus, in one embodiment, the light reflected from the windshield reflects only from the outside surface of the windshield.

Conventional polarized sunglasses are designed to block light reflected at Brewster's angle from a horizontal surface of water (s-polarized light). Thus, p-polarized light is transmitted. Accordingly, in this first embodiment, the HUD virtual image is fully visible through conventional polarized sunglasses. To a first approximation, the light reflects from only the outside surface of the windshield.

In a second embodiment, the HUD projector is configured to emit s-polarized light. The light is partially reflected from the inside surface of the windshield. The light that is not reflected passes through the half-wave plate. In so doing, the light is converted from s-polarized to p-polarized. Consequently, at the outside surface of the windshield, the p-polarized light is fully transmitted. Thus, the light reflected from the windshield, to a first approximation, reflects from only the inside surface of the windshield.

In the second embodiment, the light from the virtual image is s-polarized. Conventional sunglasses transmit only p-polarized light. Thus, the virtual image from the HUD would not be visible to a person wearing conventional sunglasses. However, it should be realized that the half-wave plate in the windshield also acts on light from the outside scene that passes through the windshield. Thus, for a person driving in a vehicle with such a windshield, glare from a puddle of water on the road would be seen as p-polarized light instead of s-polarized light. The driver could wear special sunglasses that block p-polarized light and transmit s-polarized light. With such sunglasses, the HUD virtual image would be fully visible.

To implement the invention, the windshield may be fabricated with a half-wave plate inside. Transparent plastic film that acts as a half-wave plate is commercially available. Conventionally, windshields are made with an outer layer of glass, an inner layer of glass, and a layer of plastic (typically polyvinyl butyral or PVB). The layer of plastic needs to have the same refractive index as the glass so there is no reflection at the glass-plastic interfaces. In a crash, the plastic holds onto broken windshield glass to protect the driver and front seat passenger. The plastic also helps to keep the driver and front seat passenger from being ejected through the front window in a crash. One possible way to fabricate the front windshield with a half-wave plate inside is to sandwich the plastic film that acts as a half-wave plate between two layers of PVB.

In another embodiment that enables the use of conventional polarizing sunglasses as well as the use of a wedged windshield, the wave plate inside the windshield is only approximately a half-wave plate. For example, a quarter-wave plate could be used. The tilt angle does not need to be exactly 45 degrees. For example, a tilt angle of 30 degrees or 60 degrees could alternatively be used. The use of a wedged windshield that includes a tilted wave plate is an inexpensive way to enable the use of conventional polarizing sunglasses.

Figure 3:
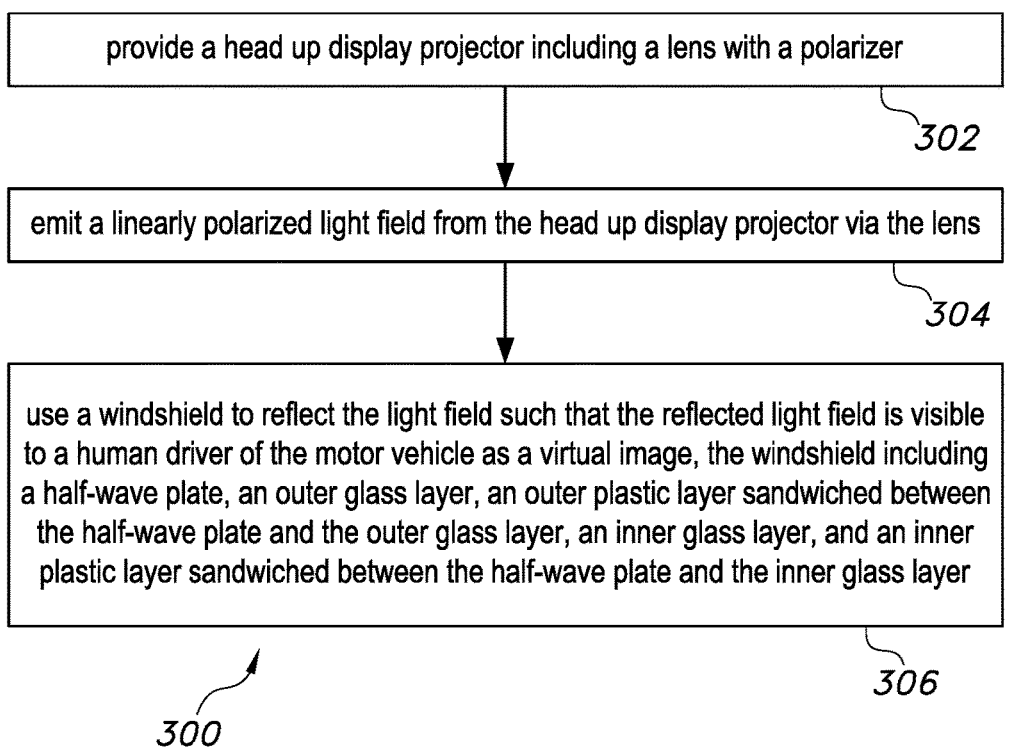
FIG. 3 is a flow chart of one embodiment of a head up display method of the present invention.

FIG. 3 illustrates one embodiment of a head up display method 300 of the present invention. In a first step 302, a head up display projector including a lens with a polarizer is provided. For example, HUD projector 12 including lens 14 with a polarizer may be provided.

Next, in step 304, a linearly polarized light field is emitted from the head up display projector via the lens. For example, HUD projector 12 emits linearly polarized light 28 through lens 14.

In a final step 306, a windshield is used to reflect the light field such that the reflected light field is visible to a human driver of the motor vehicle as a virtual image. The windshield includes a half-wave plate, an outer glass layer, an outer plastic layer sandwiched between the half-wave plate and the outer glass layer, an inner glass layer, and an inner plastic layer sandwiched between the half-wave plate and the inner glass layer. For example, windshield 16 is used to reflect light field 28 such that the reflected light field 34 is visible to a human driver 32 of the motor vehicle as a virtual image. Windshield 16 includes a half-wave plate 22, an outer glass layer 18, an outer plastic layer 20 sandwiched between half-wave plate 22 and outer glass layer 18, an inner glass layer 26, and an inner plastic layer 24 sandwiched between the half-wave plate 22 and the inner glass layer 26.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, comprising:
    a head up display projector including a lens with a polarizer, and configured to emit a linearly polarized light field via the lens; and
    a windshield configured to reflect the light field such that the reflected light field is visible to a human driver of the motor vehicle as a virtual image, the windshield including:
        a half-wave plate;
        an outer glass layer;
        an outer plastic layer sandwiched between the half-wave plate and the outer glass layer;
        an inner glass layer; and
        an inner plastic layer sandwiched between the half-wave plate and the inner glass layer.

2. The head up display arrangement of claim 1 wherein the half-wave plate is oriented to interchange s-polarization and p-polarization.

3. The head up display arrangement of claim 1 wherein an angle between a vertical axis of the windshield and an axis of the half-wave plate is 45 degrees.

4. The head up display arrangement of claim 1 wherein the light field is incident to the windshield at approximately Brewster's angle.

5. The head up display arrangement of claim 1 wherein the half-wave plate comprises a transparent plastic film.

6. A head up display method, comprising:
    providing a head up display projector including a lens with a polarizer;
    emitting a linearly polarized light field from the head up display projector via the lens; and
    using a windshield to reflect the light field such that the reflected light field is visible to a human driver of the motor vehicle as a virtual image, the windshield including:
        a half-wave plate;
        an outer glass layer;
        an outer plastic layer sandwiched between the half-wave plate and the outer glass layer;
        an inner glass layer; and
        an inner plastic layer sandwiched between the half-wave plate and the inner glass layer.

7. The method of claim 6 wherein the half-wave plate is oriented to interchange s-polarization and p-polarization.

8. The method of claim 6 wherein an angle between a vertical axis of the windshield and an axis of the half-wave plate is 45 degrees.

9. The method of claim 6, wherein the light field is incident to the windshield at approximately Brewster's angle.

10. The method of claim 6 wherein the half-wave plate comprises a transparent plastic film.

11. A head up display arrangement for a motor vehicle, comprising:
    a head up display projector apparatus configured to emit a linearly polarized light field; and
    a windshield having a vertical axis and being configured to reflect the light field such that the reflected light field is visible to a human driver of the motor vehicle as a virtual image, the windshield including:
        a half-wave plate having an axis oriented at an angle of 45 degrees relative to the vertical axis of the windshield;
        an outer glass layer;
        an outer plastic layer sandwiched between the half-wave plate and the outer glass layer;
        an inner glass layer; and
        an inner plastic layer sandwiched between the half-wave plate and the inner glass layer.

12. The head up display arrangement of claim 11 wherein the half-wave plate is oriented to interchange s-polarization and p-polarization.

13. The head up display arrangement of claim 11 wherein the light field is incident to the windshield at approximately Brewster's angle.

14. The head up display arrangement of claim 11 wherein the half-wave plate comprises a transparent plastic film.

* * * * *